Oct. 18, 1949.  J. D. GUELPH  2,485,284
STRIPPER

Filed Jan. 30, 1947  2 Sheets-Sheet 1

INVENTOR.
JOHN D. GUELPH
BY Wm. S. Pritchard
ATTORNEY.

Oct. 18, 1949.        J. D. GUELPH         2,485,284
                         STRIPPER
Filed Jan. 30, 1947                    2 Sheets-Sheet 2

INVENTOR.
JOHN D. GUELPH
BY Wm. S. Pritchard
        ATTORNEY.

Patented Oct. 18, 1949

2,485,284

UNITED STATES PATENT OFFICE 2,485,284

STRIPPER

John D. Guelph, Paterson, N. J., assignor to A. R. D. Corporation, New York, N. Y., a corporation of New York Application January 30, 1947, Serial No. 725,382

10 Claims. (Cl. 18—16)

This invention relates to molding machines. More particularly, it relates to a new and improved ejecting mechanism for molding machines.

In conventional injection-molding machines wherein the molding cavity is formed by a pair of complemental relatively movable die members, the casting is removed from the die by ejector pins after the die members have been separated. In general, in such machines the ejector pins are carried on an ejector plate which, in turn, is secured to an ejector rod projecting from the movable platen (mold clamp). The ejector rod, as the mold clamp moves in its opening stroke, strikes and engages a stationary part of the machine whereby, during further descent of the movable platen, the ejector plate and the pins carried thereby are actuated to eject the molding from the die.

In conventional injection-molding machines wherein cores are utilized, the molding is either stripped from the cores by the ejecting mechanism previously described, or the molding together with the cores are ejected by the ejecting mechanism and thereafter the cores manually pulled or moved by means dependent on the stroke.

In each of the aforementioned injection-molding machines, the removal of the molding from the die is effected during and is dependent on the opening stroke of the mold clamp.

An object of this invention is to provide an ejecting mechanism for a molding machine which is operative independently of the stroke of the opening clamp.

Another object of this invention is to provide an ejecting mechanism for an injection-molding machine which can be operated at any position of the clamp and independently of the stroke of said clamp.

An additional object of this invention is to provide a core puller for an injection-molding apparatus which is operative independently of the stroke of the opening clamp.

A further object of this invention is to provide a core puller for an injection-molding apparatus which can be operated in any position of the clamp and independently of the stroke of said clamp.

A still further object of this invention is to provide a core puller and an ejector for an injection-molding apparatus, said core puller and ejector being separately operated in the desired sequence and independently of the stroke of the opening clamp.

Other and additional objects will become apparent hereinafter.

The objects of this invention are accomplished, in general, by associating a core plate and an ejector plate with the die member carried by the movable clamp of an injection-molding machine, and providing separate means to actuate the core plate and the ejector plate in the desired sequence independently of each other and the stroke of the opening clamp.

The core plate is secured to a plunger, herein called "core plate plunger," provided with a rack meshing with a gear segment of a disc which is free to rotate about its center. The disc is formed with a cam (cut-out) which is adapted to engage a roller free to move in a straight line path at right angles to the movement of the rack. The roller is carried on an extension rigidly secured to a piston rod and, upon actuation of the piston carried by the piston rod in the desired direction, the core plate plunger, and hence the core plate carried thereby, will be moved vertically up or down as desired. Means are provided to limit the rotary movement of the disc in both its clockwise and counterclockwise movements, with the result that the vertical movement, either up or down, of the core plate in either direction is limited. The roller and limiting means also serve to maintain the disc rigid at the end of its rotary movement.

The ejector plate is secured to a second plunger, herein called "ejector plate plunger," which is formed with a rack meshing with a gear segment of a disc identical in construction and mounted in the same manner as the disc cooperating with the core plate plunger. The disc cooperating with the ejector plate plunger is operated by means identical to that which actuates the core plate plunger.

The ejector plate plunger is hollow and the core plate plunger slidably positioned therein. The core plate plunger and the ejector plate plunger are operated independently of each other and independently of the movements of the movable platen of the press.

When the machine is employed for casting, solid castings and cores are not utilized, the core plate is omitted and the ejector plate is positioned on both of the previously described plungers, and either one of which can be operated to effect the ejecting action after the movable platen has been opened to any desired position.

The invention will be more clearly understood by reference to the following detailed description when taken in connection with the accompanying drawing, in which.

Figure 1:
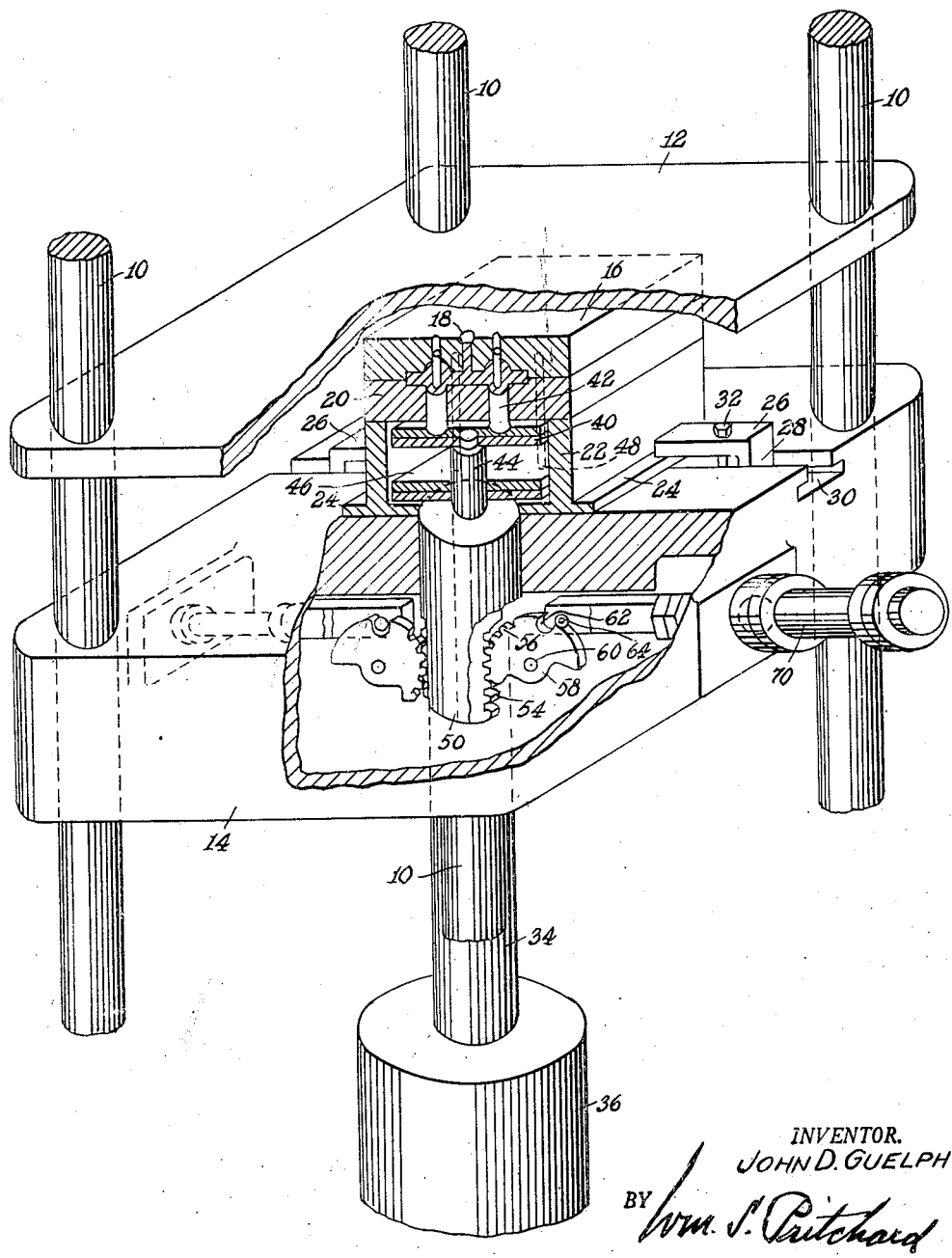
Figure 1 is a perspective view, partly broken away and partly in section, of an injection molding machine in molding position containing the core puller and ejector mechanisms.

Referring now to the drawings wherein like reference numerals designate like parts, the reference numeral 10 designates each of a plurality of rods which are appropriately secured and fixedly mounted in the machine and on which a platen 12 is fixedly secured and a movable platen 14 is appropriately mounted for sliding movement thereon. An upper die member 16 is appropriately removably secured to the under surface of the top platen 12. The upper die member 16 is provided with a passage 18 which is connected to a gate (not shown) and into which the material to be molded is introduced. The upper die member 16 is designed to cooperate with a lower die member 20. The two die members 16 and 20 are complemental and, when in molding position as hereinafter more fully described, will provide a molding cavity or cavities of the desired shapes and sizes.

The lower die member 20 is appropriately removably secured onto an ejector box 22, the bottom of which is seated on and adjustably secured to the lower platen 14. The bottom of the ejector box 22 is provided with slide flanges 24 which are adapted to be engaged by spaced clamps 26. Each clamp 26 is formed with a T-shaped tongue 28 which is slidably positioned in a T-slot 30 in the lower platen 14 and is secured in clamping position by a lock screw 32.

The lower platen 14 is secured at its bottom to the top of a piston rod 34 which is actuated by hydraulic means, generally designated by the reference numeral 36, in the usual manner to raise and lower the lower platen 14. If desired, the usual hydraulic means (not shown) can cooperate with the top platen 12.

In the ejector box 22, there is provided a core plate 40 which carries the cores 42. The core plate 40 is appropriately and removably secured to the top of a core plate plunger 44. An ejector plate 46 carrying ejector pins 48 is also positioned in the ejector box 22. The ejector plate 46 is appropriately and removaly secured to an ejector plunger 50. As is shown in Figure 1, the core plate 40 is located above the ejector plate 46, and both of such plates are adapted for movement in the ejector box 22.

The ejector plate plunger 50 is hollow, and the core plate plunger 44 is positioned axially and slidably therein.

The core plate plunger 44 and the ejector plate plunger 50 are, in accordance with the principles of this invention, adapted to be moved independently of each other and also independently of the movement of the lower platen when it is moved to open the die. The mechanisms for effecting such independent operations and movements will now be described.

The core plate plunger 44 is formed with a rack 54 at the lower part thereof. The rack 54 engages a gear segment 56 of a disc, generally designated by the reference numeral 58, which is freely rotatable on a pin 60. The disc 58 is provided with a cam which, in the form shown, is a cut-out 62. The cut-out 62 is adapted to be engaged by a roller 64 mounted on a pin 65 at one end of an extension 66. The other end of the extension 66 is threaded on one end of a piston rod 68, and is rigidly secured in position by lock nuts 69. The other end of the piston rod 68 carries a piston (not shown) which is mounted for sliding movement in the cylinder 70. The piston is actuated by a fluid in the usual manner. The extension 66 passes through a guide 71 and is adapted to move in a straight line path at right angles to the rack 54. Consequently, the roller 64 carried on the extension 66 will move in a similar straight line path.

The disc 58 is provided with stop elements 72 and 74 which are adapted to cooperate with a stop 76 secured to the bottom of the platen whereby the rotation of the disc in either direction is limited.

Figure 2:
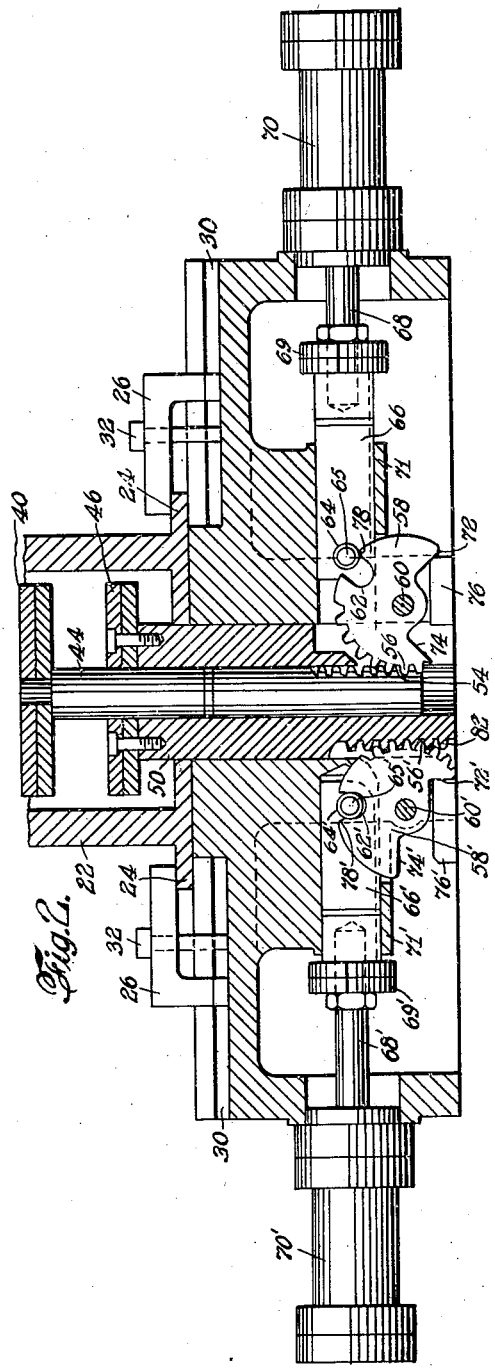
Figure 2 is a vertical section illustrating the core puller and ejector mechanisms and associated parts in molding position.
Figure 3:
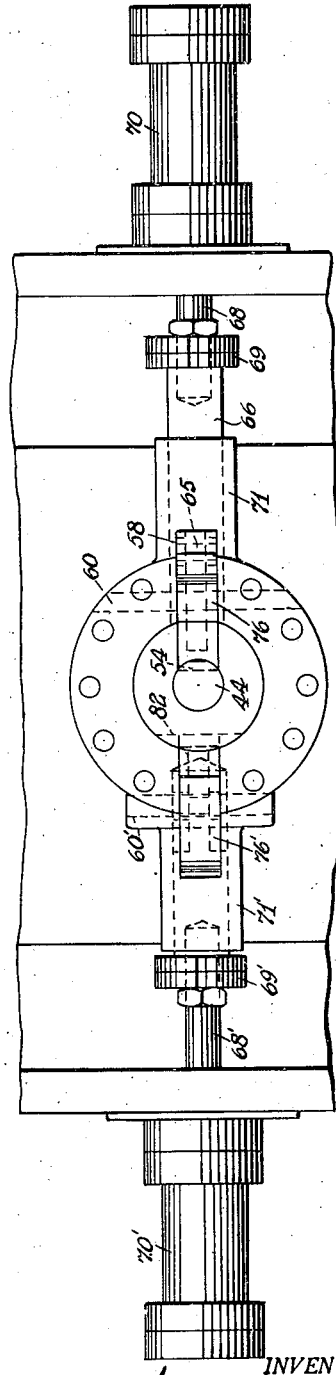
Figure 3 is a bottom view of the apparatus shown in Figure 2.

In the form shown in Figure 2, the core plate is in the molding position. In order to lower the core plate, the piston rod 68 is actuated through the proper introduction of hydraulic fluid in the cylinder so as to cause the piston rod 68 to move toward the left in Figure 2. The roller 64 will be also moved to the left and enter the cut-out 62. Continued movement of the piston causes the roller 64 to rotate the disc counterclockwise, lowering the core plunger until the stop element 74 engages the stop 76. At this time, the disc 58 is locked in position due to the action of the roller 64 and the stop 76 thereon. On the opposite movement of the piston (i. e. to the right in Figure 2), the roller 64 will also be moved to the right and it will rotate the disc 58 clockwise until the stop element 72 engages the stop 76. The cut-out is provided with a straight edge 78 so located that, when the stop element 72 is in position on the stop 76, such edge will be disposed in a horizontal position and the roller 64 will rest thereon, with the result that the disc 58 will be locked in such position. It is to be noted that, when the disc 58 is rotated counterclockwise, the core plate plunger is moved vertically downwardly and, when the disc 58 is rotated clockwise, the core plate plunger is moved vertically upwardly.

The ejector plate plunger 50 is formed with a rack 82 at the lower part thereof. The rack 82 engages a gear segment 56' of a disc, generally designated by the reference numeral 58', which is freely rotatable on a pin 60'. The disc 58' is provided with a cam which, in the form shown, is a cut-out 62'. The cut-out 62' is adapted to be engaged by a roller 64' mounted on a pin 65' at one end of an extension 66'. The other end of the extension 66' is threaded on one end of a piston rod 68', and is rigidly secured in position by lock nuts 69'. The other end of the piston rod 68' carries a piston (not shown) which is mounted for sliding movement in the cylinder 70'. The extension 66' passes through a guide 71' and is adapted to move in a straight line path at right angles to the rack 84. Consequently, the roller 64' carried on the extension 66' will move in a similar straight line path.

The disc 58' is provided with stop elements 72' and 74' which are adapted to cooperate with the stop 76, whereby the rotation of the disc in either direction is limited.

In the form shown in Figure 2, the ejector plate is in the low position and the piston rod 68' is at the end of its stroke toward the right in Figure 1. At this time, the roller 64' is in the cut-out 62' and the stop element 72' is in engagement with the stop 76, with the result that the disc 58' is locked in such position. In order to elevate the ejector plate, the piston rod 68' is actuated through the proper introduction of hydraulic fluid in the cylinder 70' so as to cause the piston rod 68' to move toward the left in Figure 2. The roller 64' will also be moved to the left and it will rotate the disc 58' counterclockwise until the stop element 74' engages the stop 76'. The cut-out 62' is provided with a straight edge 78' so located that when the stop element 74' is in engagement with the stop 76' such edge 78' will be disposed in a horizontal position and the roller 64' will rest thereon with the result that the disc 58' will be locked in such position. Thereafter, when it is desired to lower the ejector plate, the piston is actuated so that it will move in the opposite direction, i. e. toward the right in Figure 2. The roller 64' will be introduced into the cut-out 62' and further movement of the piston will cause it to rotate the disc 58' until the stop element 74' engages the stop 76'. In his position as previously described, the disc 58' will be locked by reason of the roller 64' in the cut-out 62' and the engagement of the stop element 74' with the stop 76'.

The ejector plate plunger 50 is hollow and the core plate plunger 44 is slidably and axially positioned therein. In order to permit access of the gear segment 56 to the rack 54, the core plate plunger is slotted, as shown in Figure 2.

In operation, the desired die member 16 is secured to the upper platen 12; and the desired complemental die member 20, together with the appropriate ejector box 22, is clamped in proper position on the lower platen 14 by means of the clamps 26. The core plate 40 is secured to the core plate plunger 44 which is in position so that, upon actuation of the piston as previously described, it will move in a vertical direction (downward) to pull the cores. It is to be noted that in this position the disc 58 is locked in position by the roller 64 which is seated on the edge 78, and the stop element 72 being in engagement with the stop member 76, as shown in Figure 2. The ejector plate 46 is secured on the ejector plate plunger 50 which is in position so that, upon actuation of its mechanism, it will move in a vertical upward direction to strip the molding from the die. In this position, the roller 64' is in the cut-out 62' and the stop element 74' is in engagement with the stop member 76', as shown in Figure 2. The disposition of the roller 64' in the cut-out 62' and the engagement of the stop element 74' with the stop member 76' serves to lock the ejector plate plunger in such position.

The hydraulic mechanism 36 is actuated to elevate the lower platen 14 and clamp the die member 16 in close intimate relationship with the die member 20. At this stage, the core plate 40 and the ejector plate 46 are positioned as shown in Figure 1; and the positions of the mechanisms for actuating the plungers are shown in both Figures 1 and 2.

The plastic to be molded, which is preferably preheated, is forced under pressure through the gate and through the passage 18 to fill the die cavities. After the molding has cooled sufficiently, the hydraulic means 36 is actuated so that it will cause the lower platen to descend and separate the die members 16 and 20 from each other.

At any desired time after the lower die member 20 has been separated from the upper die member 16, the piston in the cylinder 70 is actuated in the usual manner so that it will move toward the left in Figure 2. During this operation, the roller 64 will enter the cut-out 62 and rotate the disc 58 on the pin 60 until the stop element 74 engages the stop 76, whereby the gear segment 56 in cooperation with the rack 54 will cause the core plate plunger 44 to descend, whereby the cores 42 are pulled. After the cores have been pulled, the piston in the cylinder 70 is actuated in the usual manner so that it will move to the left in Figure 2. During this movement, the roller 64' will rotate the disc 58' about its pivot 60' until the stop element 72' is in engagement with the stop member 76' and the roller 64' rests on the edge 78'. This operation causes the gear segment 56' to move the rack 82, and hence the plunger 50 secured thereto upwardly, whereby the molding is stripped from the die. After the molding has been removed, the respective piston rods are actuated in the usual manner to restore the core plate 40 and the ejector plate 46 to the original molding position and the cycle of operations previously described repeated.

In the embodiment of the invention specifically described, the disc has a curved cut-out which is to receive and engage a roller, but it is to be understood that the invention is not restricted thereto. The cut-out can be of any appropriate shape and the means carried by the piston extension can be of a corresponding shape so that it can be engaged by said cut-out.

Though hereinbefore the operation has been described as applied to an injection molding machine for the molding of articles requiring the use of cores, it is to be understood that the invention is not restricted thereto. The invention is equally applicable for use in injection molding machines for molding solid articles which do not require the use of cores. In such an embodiment of the invention, the core plate and cores described in the preceding embodiment are omitted, and the ejector plate can be secured to either the ejector plate plunger or the core plate plunger, as desired. Alternatively, the ejector plate plunger can be disposed on both the plungers 44 and 50. In such embodiment, the plungers are both disposed in position so that at the beginning of the molding operation, each of the plunger-actuating mechanisms will be in position so that, upon actuation of either, the plunger will be elevated. After the molding operation and the molding has been secured and the two die members 16 and 20 have been separated, as previously described, either piston can be operated so as to elevate the ejector plate. Alternatively, both of the pistons can be operated whereby the ejector plate will be moved upwardly and the molding stripped from the die.

As is apparent from the foregoing embodiments, the plungers and their actuating mechanisms can be used without change with either dies having both ejector means and a core-pulling means or dies having only ejector means. In general, the invention can be utilized to actuate any mechanism associated with the die in an injection molding machine and which removes or aids in removing the molding from the die cavity.

When the injection molding machine is intended to produce only solid moldings (not requiring the use of cores), not only can the core plate be omitted but also the core plate plunger and the actuating mechanism therefor.

The invention, though it is admirably suited for use in connection with injection molding machines with or without cores, is not restricted thereto. It can be utilized in molding machines of any type wherein the die members which form the molding cavity are movable relative to each other and which utilize ejector pins with or without core pullers. In general, the invention can be applied to molding machines, such as injection molding machines, die casting machines, compression molding machines, transfer molding machines, power metallurgy pressers, ceramic compression pressers or the like, irrespective of whether the die members move relative to each other in a horizontal or vertical position.

The invention can be applied to molding machines irrespective of the size of the molding. Whenever necessary, the stroke of the plungers 44 and 50 can be adjusted by adjustment of the stroke of the piston rod. Due to the fact that the piston rods move in a straight line and the disc actuated thereby moves about a pivot, the plungers will be given vertical movements in a straight line path.

The ejection and core-pulling operations when used are effected separately and independently of each other. These operations are also effected independently of the movement of the lower platen. As a matter of fact, these operations can be effected after the dies have separated and the lower platen is stationary. Of course, the operations can also be effected after separation and during movement of the lower platen away from the upper platen.

Since it is obvious that various changes and modifications may be made in the above description without departing from the nature or spirit thereof, this invention is not restricted thereto except as set forth in the appended claims.

I claim:

1. A molding machine comprising a pair of platens, a die member carried by each of said platens, means to move one of said platens toward and away from the other, an ejector plate carried by said movable platen, an ejector plate plunger on which said ejector plate is positioned, a rack on said ejector plate plunger, a rotatable gear segment in cooperative relationship with said rack, means to rotate said gear segment in either direction independently of the movement of said movable plate whereby said rack will be moved upwardly or downwardly as desired, means to limit the rotation of said gear segment in either direction, and means to lock said gear segment at the limit of its rotation with the rack in its upper position.

2. A molding machine comprising a pair of platens, a die member carried by each of said platens, means to move one of said platens toward and away from the other, an ejector plate carried by said movable platen, an ejector plate plunger on which said ejector plate is positioned, a rack on said ejector plate plunger, a rotatable disc having a gear segment in cooperative relationship with said rack, said disc having a cut-out, a member adapted to move in a straight line path in either direction perpendicular to said rack and engage said cut-out, and means to move said member independently of the movement of said movable platen whereby during engagement of said member by said cut-out said disc will be rotated in a direction depending on the direction of movement of said member in its path and the plunger will be moved up or down.

3. A molding machine comprising a pair of platens, a die member carried by each of said platens, means to move one of said platens toward and away from the other, an ejector plate carried by said movable platen, an ejector plate plunger on which said ejector plate is positioned, a rack on said ejector plate plunger, a rotatable disc having a gear segment in cooperative relationship with said rack, said disc having a cut-out, a member adapted to move in a straight line path in either direction perpendicular to said rack and engage said cut-out, means to move said member independently of the movement of said movable platen whereby during engagement of said member by said cut-out said disc will be rotated in a direction depending on the direction of movement of said member in its path and the plunger will be moved up or down, and means to limit the rotation of said disc in either direction.

4. A molding machine comprising a pair of platens, a die member carried by each of said platens, means to move one of said platens toward and away from the other, an ejector plate carried by said movable platen, an ejector plate plunger on which said ejector plate is positioned, a core plate carried by said movable platen, a hollow core plate plunger in which said ejector plate plunger is slidably mounted and on which said core plate is positioned, a rack on said ejector plate plunger, a rotatable gear segment in cooperative relationship with said rack, a rack on said core plate plunger, a rotatable gear segment in cooperative relationship with said core plate plunger rack, and means to rotate each of said segments in either direction independently of each other and of the movement of said movable platen whereby the respective racks will be moved upwardly or downwardly as desired.

5. A molding machine comprising a pair of platens, a die member carried by each of said platens, means to move one of said platens toward and away from the other, an ejector plate carried by said movable platen, an ejector plate plunger on which said ejector plate is positioned, a core plate carried by said movable platen, a hollow core plate plunger in which said ejector plate plunger is slidably mounted and on which said core plate is positioned, a rack on said ejector plate plunger, a rotatable gear segment in cooperative relationship with said rack, a rack on said core plate plunger, a rotatable gear segment in cooperative relationship with said core plate plunger rack, means to rotate each of said segments in either direction independently of each other and of the movement of said movable platen whereby the respective racks will be moved upwardly or downwardly as desired, and means to limit the rotation of each of said gear segments in either direction.

6. A molding machine comprising a pair of platens, a die member carried by each of said platens, means to move one of said platens toward and away from the other, an ejector plate carried by said movable platen, an ejector plate plunger on which said ejector plate is positioned, a core plate carried by said movable platen, a hollow core plate plunger in which said ejector plate plunger is slidably mounted and on which said core plate is positioned, a rack on said ejector plate plunger, a rotatable gear segment in cooperative relationship with said rack, a rack on said core plate plunger, a rotatable gear segment in cooperative relationship with said core plate plunger rack, means to rotate each of said segments in either direction independently of each other and of the movement of said movable platen whereby the respective racks will be moved upwardly or downwardly as desired, means to limit the rotation of each of said gear segments in either direction, and means to lock each of said gear segments at the limit of its rotation with the rack in its upper position.

7. A molding machine comprising a pair of platens, a die member carried by each of said platens, means to move one of said platens toward and away from the other, an ejector plate carried by said movable platen, an ejector plate plunger on which said ejector plate is positioned, a hollow core plate plunger in which said ejector plate plunger is slidably mounted and on which said core plate is positioned, a rack on said ejector plate plunger, a rack on said core plate plunger, a rotatable disc having a gear segment in cooperative relationship with said ejector plate plunger rack, a rotatable disc having a gear segment in cooperative relationship with said core plate plunger rack, each of said discs having a cut-out, a pair of rollers, each roller being adapted to move in a straight line path in either direction and engage one of said cut-outs, and means to move each roller independently of each other and the movement of said movable platen whereby during engagement of a roller by a cut-out the respective disc will be rotated in a direction in accordance with the direction of movement of said roller and the respective rack moved up or down.

8. A molding machine comprising a pair of platens, a die member carried by each of said platens, means to move one of said platens toward and away from the other, an ejector plate carried by said movable platen, an ejector plate plunger on which said ejector plate is positioned, a hollow core plate plunger in which said ejector plate plunger is slidably mounted and on which said core plate is positioned, a rack on said ejector plate plunger, a rack on said core plate plunger, a rotatable disc having a gear segment in cooperative relationship with said ejector plate plunger rack, a rotatable disc having a gear segment in cooperative relationship with said core plate plunger rack, each of said discs having a cut-out, a pair of rollers, each roller being adapted to move in a straight line path in either direction and engage one of said cut-outs, means to move each roller independently of each other and the movement of said movable platen whereby during engagement of a roller by a cut-out the respective disc will be rotated in a direction in accordance with the direction of movement of said roller and the respective rack moved up or down, and means to limit the rotation of each of said discs in either direction.

9. A molding machine comprising a pair of platens, a die member carried by each of said platens, means to move one of said platens toward and away from the other, an ejector plate carried by said movable platen, a plunger on which said ejector plate is seated, a second plunger one of said plungers being hollow and the other slidably positioned therein, each of said plungers having a rack, a pair of rotatable discs, each of said discs having a cut-out and a gear segment in cooperative relationship with one of said racks, a pair of rollers, each roller being adapted to move in a straight line path in either direction and engage one of said cut-outs, and means to move each roller independently of each other and the movement of the movable platen whereby during engagement of a roller by a cut-out the respective disc will be rotated in a direction in accordance with the direction of movement of said roller and the respective rack moved up or down.

10. A molding machine comprising a pair of platens, a die member carried by each of said platens, means to move one of said platens toward and away from the other, an ejector plate carried by said movable platen, a plunger on which said ejector plate is seated, a second plunger one of said plungers being hollow and the other slidably positioned therein, each of said plungers having a rack, a pair of rotatable discs, each of said discs having a cut-out and a gear segment in cooperative relationship with one of said racks, a pair of rollers, each roller being adapted to move in a straight line path in either direction and engage one of said cut-outs, means to move each roller independently of each other and the movement of the movable platen whereby during engagement of a roller by a cut-out the respective disc will be rotated in a direction in accordance with the direction of movement of said roller and the respective rack moved up or down, and means to limit the rotation of each of said discs in either direction.

JOHN D. GUELPH.

REFERENCES CITED

The following references are of record in the file of this patent:

UNITED STATES PATENTS

| Number | Name | Date |
| --- | --- | --- |
| 1,599,624 | Stern | Sept. 14, 1926 |
| 1,724,332 | Will | Aug. 13, 1929 |
| 2,269,389 | Weida | Jan. 6, 1942 |
| 2,302,367 | Ericson | Nov. 17, 1942 |